United States Patent [19]

Kawasaki et al.

[11] Patent Number: 5,166,717
[45] Date of Patent: Nov. 24, 1992

[54] CAMERA SYSTEM

[75] Inventors: Masahiro Kawasaki; Hiroyuki Takahashi; Shigeru Iwamoto, all of Tokyo, Japan

[73] Assignee: Asahi Kogaku Kogyo Kabushiki Kaisha, Tokyo, Japan

[21] Appl. No.: 701,858

[22] Filed: May 17, 1991

[30] Foreign Application Priority Data

May 17, 1990 [JP] Japan ................... 2-127938

[51] Int. Cl.⁵ .................. G03B 3/10; G03B 9/02
[52] U.S. Cl. .................. 354/195.11; 354/195.13; 354/271.1; 354/286
[58] Field of Search ............ 354/271.1, 286, 195.11, 354/195.13

[56] References Cited

U.S. PATENT DOCUMENTS

| | | | |
|---|---|---|---|
| 4,477,164 | 10/1984 | Nakai et al. | 354/286 |
| 4,509,842 | 4/1985 | Taniguchi et al. | 354/402 |
| 4,560,267 | 12/1985 | Nakai et al. | 354/412 |
| 4,602,861 | 7/1986 | Taniguchi et al. | 354/403 |
| 4,673,275 | 6/1987 | Nakai et al. | 354/412 |
| 4,841,322 | 6/1989 | Kawasaki et al. | 354/400 |
| 4,945,376 | 7/1990 | Kawasaki et al. | 354/400 |

Primary Examiner—Michael L. Gellinen
Attorney, Agent, or Firm—Sandler, Greenblum & Bernstein

[57] ABSTRACT

A camera system for communicating data between a micro computer on a camera body and a zoom lens mounted to the camera body, wherein at least exposure data on the diaphragm is transmitted from the zoom lens to the micro computer of the camera body, and wherein the zoom lens includes a position detecting device for detecting one of the divided focal length steps corresponding to a focal length of the zoom lens, a memory for storing data peculiar to the zoom lens, and an arithmetic operating device for calculating the exposure data on the diaphragm in accordance with the data of the position detecting device and the memory.

8 Claims, 8 Drawing Sheets

CAMERA SYSTEM

BACKGROUND OF THE INVENTION

1. Field of the Invention

The present invention relates to a camera system that functions to communicate data between a camera body and a photographing lens.

2. Description of Related Art

In a recent single lens reflex camera having an automatic focusing device, information peculiar to a photographing lens, such as open F-number data used in an automatic exposure function or an automatic focusing function, is sent as electrical signals from the photographing lens to a CPU (central processing unit) of a camera body.

Information peculiar to the photographing lens is stored in a lens ROM provided in the photographing lens. The photographing lens and the camera body are provided with electrical contacts on a lens mount and a body mount to transmit and receive signal information between the photographing lens and the camera body, respectively. The body CPU transmits and receives the signal information to and from the lens ROM through the electrical contacts and reads the data stored in the lens ROM. A clock pulse is outputted from the camera body to send address signals from the body CPU synchronously therewith, so that predetermined data can be output from the lens ROM in accordance with the address signals.

However, in an arrangement in which a motor is provided also in the photographing lens to control the power zooming etc., if all the control operations in the photographing lens are effected by the body CPU, there is an over load thereon. In particular, in a single lens reflex camera in which various kinds of photographing lenses are exchangeably mounted to the same camera body, the body CPU must read different parameters, depending on the photographing lenses from the associated lens ROM's and perform predetermined arithmetic operations in accordance with the read parameters thereby to control the photographing lenses. This makes quick operations impossible or next to impossible.

In a zoom lens, a minimum Av value (open diaphragm F number) increases as the focal length increases. Namely, the relationship between the minimum Av value and a focal length is represented by a linear function. Accordingly, the minimum Av values corresponding to the focal lengths are all stored in the ROM of the photographing lens. Consequently, various data, including the minimum Av values are stored in a ROM so that the memory (capacity) of the ROM, in which the data can be written is reduced. Therefore, the stored data must be partially erased, or a large ROM must be used instead of a conventional ROM to write new data.

SUMMARY OF THE INVENTION

The primary object of the present invention is to provide a camera system in which the load of operations on a camera body side is reduced and all diaphragm value exposure data is not stored in a ROM, but is calculated and used in accordance with need.

The basic concept of the present invention resides in that all of the exposure data on the diaphragm value are not stored in the ROM, but are calculated when needed.

To achieve the object mentioned above, according to the present invention, there is provided a camera system for data communication between a micro computer provided in a camera body and a zoom lens that is mounted to the camera body, wherein the zoom lens, at the least, exposure data to the micro computer of the camera body, and wherein the zoom lens comprises a position detecting means for detecting one of a plurality of divided focal length steps to which an optional focal length of the zoom lens belongs, means for storing the data peculiar to the zoom lens, and an arithmetic operation means for calculating the exposure data in accordance with data of the position detecting means and the memory means.

In this arrangement, the load of operations on the micro computer of the camera body can be reduced, and the arithmetic operation means calculates the exposure data of the diaphragm value only when it is needed. Accordingly, it is not necessary to always store the exposure data in the ROM. Thus, the effective memory (storage capacity) of the ROM can be increased. The exposure data can be easily and accurately calculated when necessary.

The present disclosure relates to subject matter contained in Japanese patent application No. HEI 2-127938 (filed on May 17, 1990) which is expressly incorporated herein by reference in its entirety.

BRIEF DESCRIPTION OF THE DRAWINGS

The invention will be described below in detail with reference to the accompanying drawings, wherein.

DESCRIPTION OF THE PREFERRED EMBODIMENTS

Figure 1:
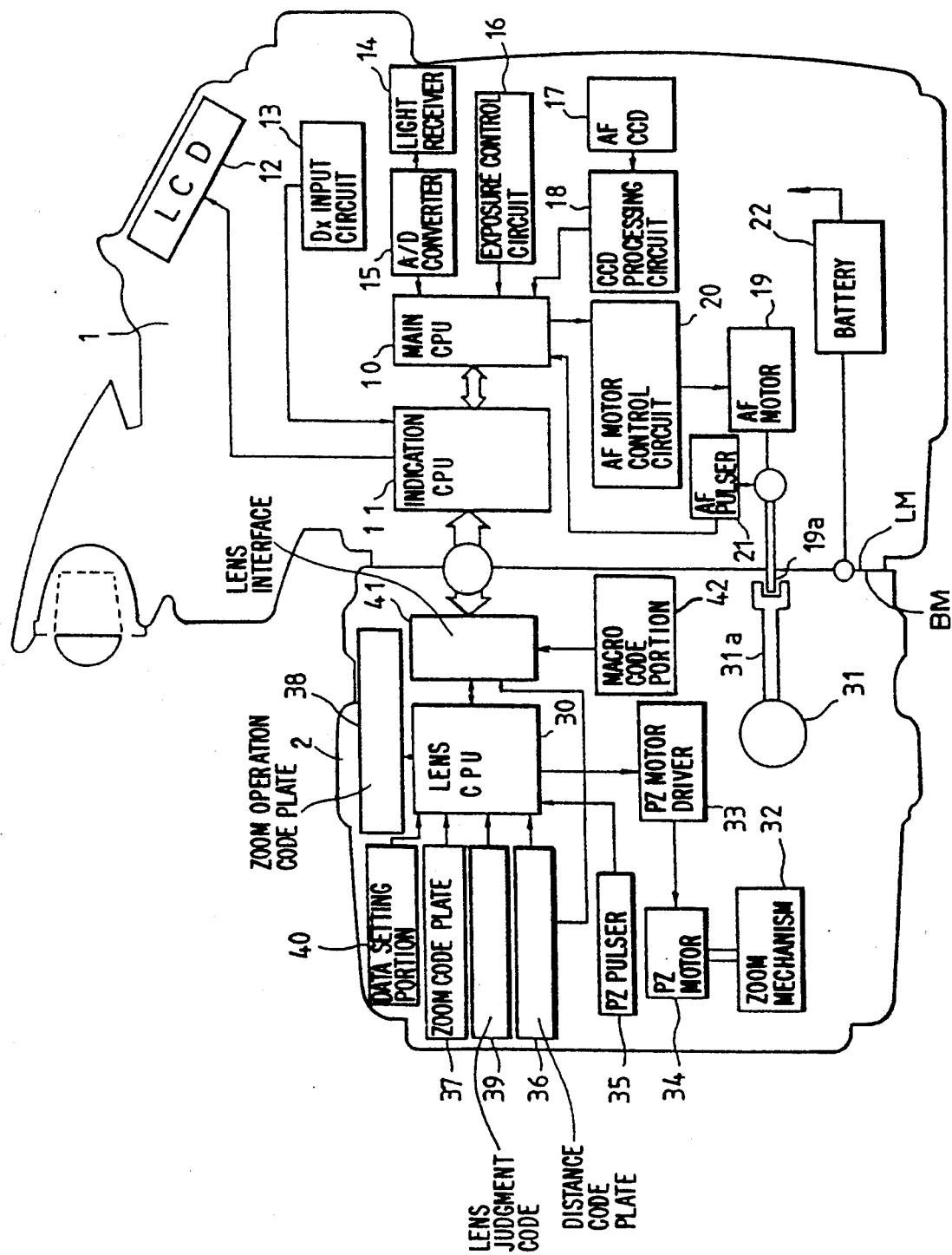
FIG. 1 is a block diagram of a single lens reflex camera having a camera system according to the present invention.

FIG. 1 shows a single lens reflex camera of a camera system according to one aspect of the present invention.

Camera body 1 has a main CPU 10 and an indication CPU 11. The main CPU 10 generally controls the whole camera system and performs arithmetic operations of various data necessary for taking a picture. The indication CPU 11 functions not only as an interface (data communication) to data that is inputted by switch members and to transmit and receive data (signals) to and from a photographing lens (zoom lens) 2, but also as a controller to control the indication of the photographing data.

The indication CPU 11 is connected to an LCD panel 12 which indicates photographing data and a DX code input circuit 13 which selectively reads at least ISO sensitivity data of a film from DX codes provided on a surface of a patrone of a film.

A light receiver 14, which receives light incident thereon through the photographing lens 2 and outputs analog signals in accordance with the amount of light received, is connected to the main CPU 10 through an A/D converter 15.

The main CPU 10 is also connected to an exposure control circuit 16, which drives and controls a shutter mechanism (not shown) and a diaphragm mechanism (not shown), etc., in accordance with the inputted photographing data. A CCD processing circuit 18 is connected to the main CPU 10 and detects a focusing of the photographing lens 2 in response to data (focal point data) of an object to be photographed that is outputted from an automatic focusing CCD object distance measuring sensor 17. An AF motor control circuit 20, also connected to the main CPU 10, which drives an AF motor 19 for carrying out the focusing of the photographing lens 2 in conjunction with an AF pulser 21 which detects the angular displacement of the AF motor 19 and generates pulses corresponding to the angular displacement. The object distance measuring sensor 17 receives light of the object to be taken. The light is made incident thereon through the photographing lens 2 to output a predetermined focus data signal.

The AF motor 19 transmits the drive power to the photographing lens 2 through a coupler 19a that is provided on a body mount BM of the camera body so as to be extended from the camera body and a coupler 31a provided on a lens mount LM of the photographing lens 2 when the connection between the couplers 19a and 31a is established.

A battery 22 powers not only the electronic components and electronic circuits in the camera body 1, but also the electronic components and electronic circuits in the photographing lens 2.

The photographing lens 2 has a focusing mechanism 31 which rotates a focus adjusting cam ring (not shown) to relatively move focusing lens groups in the optical axis direction, so as to effect a focusing operation. A zooming mechanism 32 rotates a zoom ring (not shown) to relatively move at least two groups of variable power lenses in the optical axis direction to effect a zooming operation.

The focusing mechanism 31 is connected to the coupler 31a, which is electrically connected to the coupler 19a when the photographing lens 2 is attached to the camera body 1 to transmit the rotational drive of the AF motor 19 to the focusing mechanism 31. The focusing mechanism 31 rotates the focus adjusting cam ring to affect the focusing. The couplers 19a and 31a are disconnected by a disengaging means (not shown), so that a photographer can manually rotate a focus adjusting operation ring to adjust the focus in a manual focusing mode.

The zooming mechanism 32 is driven by a PZ (power zoom) motor 34, which is in turn driven and controlled by a power zoom motor driving portion 33. The operation of the PZ motor driving portion 33 is controlled in the power zoom mode by the lens CPU 30 or a power zoom switch SWPZ2 (See FIG. 2), and is driven in the manual zoom mode by a manual operation of a photographer. The mode selection between the power zoom mode and the manual zoom mode is controlled by a zoom switch SWPZ1. The control is effected by a switching means.

To the input ports of the lens CPU 30 are connected a PZ pulser 35 which detects the displacement of the PZ motor 34, a distance code plate 36 which reads the position data of the focus adjusting cam ring (focusing lens groups) driven by the focusing mechanism 31 (which detects the divided focal length steps at a specific focal length), a zoom code plate 37 which reads the position data (focal length data) of the zooming cam ring (variable power lens groups) driven by the zooming mechanism 32, a zoom operation code plate 38 which inputs data with regard to the direction and speed of the power zooming by the operation of a zoom operation switch, a lens judgment code plate 39 which judges the kind of photographing lens (such as for example, zoom lens, single focus lens, or single focus macro lens, etc) and the data stored in the ROM, and a data setting portion 40 which is made of a code plate and which outputs data on a K value at a telephoto extremity and data on a single focus macro mode at an infinite object distance. In the illustrated embodiment, "K value" (automatic focusing drive pulse coefficient) means a value used for the automatic focusing operation of the lens which can be moved by the AF motor, and is the number of pulses of the AF pulser 21 necessary for moving an image plane formed by the photographing lens 2 through a unit displacement (e.g., 1 mm).

The zoom code plate 37 and other code plates, per se known, are usually made of code plates secured to a cam ring and have brushes mounted to a stationary ring with a plurality of electrical contacts which are independently brought into sliding contact with the codes of the code plates. The positions of the cam rings are usually detected as bit information by a combination of the codes with which the electrical contacts of the brushes come into contact. The focal length is divided into a plurality of equidistant focal length steps.

A lens interface 41 is connected to a data input terminal of the lens CPU 30. Data communication between the lens CPU 30 and the indication CPU 11 is affected through the lens interface 41, to which a macro code portion 42 is connected to input macro data thereto in the macro mode.

The lens CPU 30 performs the arithmetic operation to obtain various data, such as a present focal length, a present object distance, etc. The data necessary for the arithmetic operation is stored in an internal ROM (not shown) of the lens CPU 30.

Circuit of Camera Body

Figure 3:
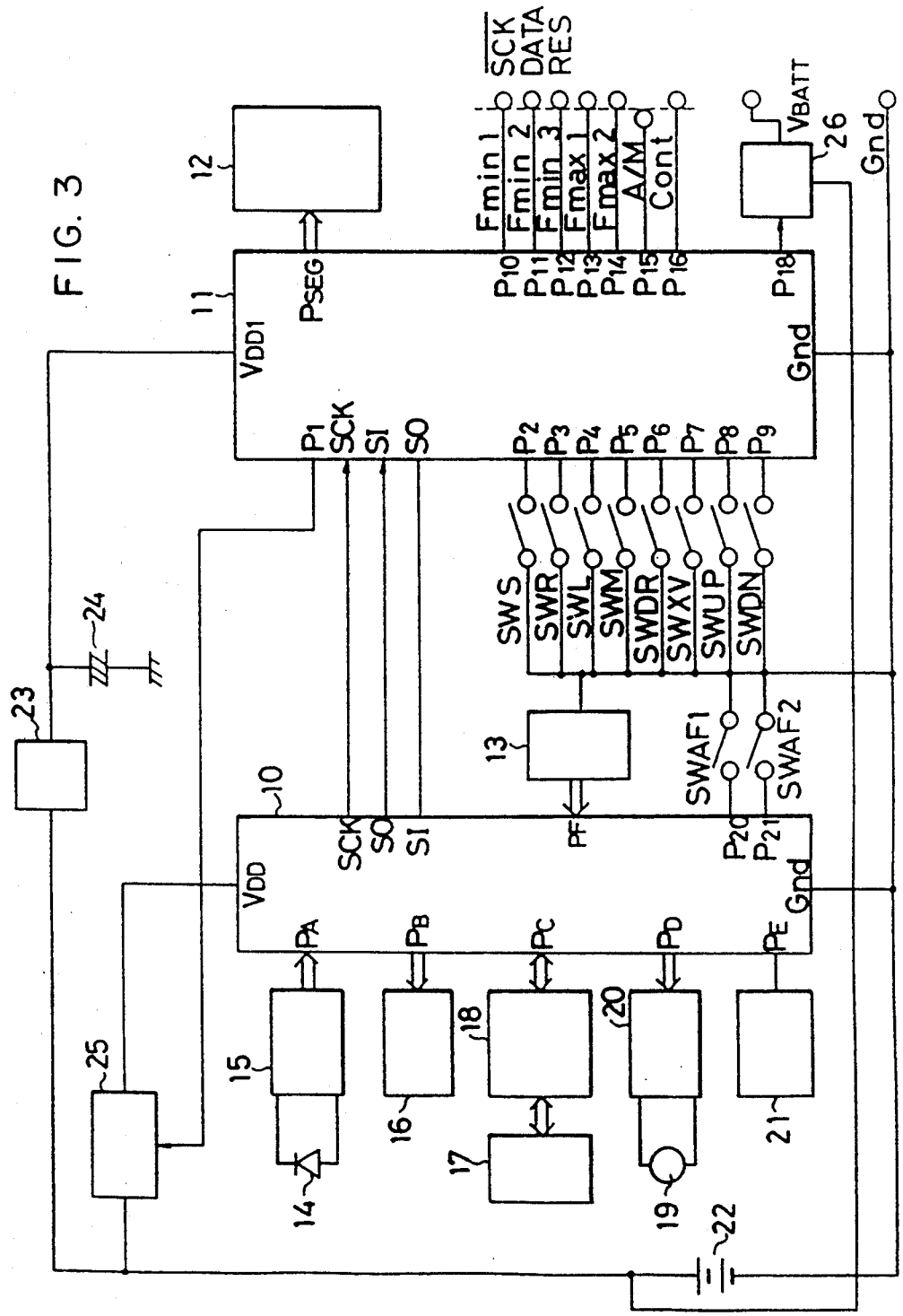
FIG. 3 is a block diagram of a main circuit arrangement of a camera body shown in FIG. 1.

The circuit arrangement of the camera body 1 will now be described below in detail with reference to FIG. 3.

The voltage of battery 22, which is controlled by a regulator 23 and backed up by a super capacitor 23, is supplied to a terminal VDD1 of the indication CPU 11. The indication CPU 11 is always activated at a constant voltage input to the terminal VDD1.

Terminal P1 of the indication CPU 11 is connected to a DC/DC converter 25 which turns the power source of the main CPU 10 ON and OFF. A photometer switch SWS, which is turned ON when a shutter button (not shown) is pressed halfway, connects terminal P2 to the DC/DC converter 25. Furthermore, terminals P3 and P4 of the indication CPU 11 are connected to a release switch SWR which is turned ON when the shutter button is fully depressed and a lock switch SWL which is turned ON when the camera is brought into a suitable photographing position, respectively.

The DC/DC converter 25 is actuated when the lock switch SWL is turned ON and when the photometer switch SWS or the release switch SWR is turned ON, in accordance with a command from the indication CPU 11 upon inputting the lens data from the photographing lens 2, the DC/DC converter 25 applies terminal VDD1 of the main CPU 10 with a reference constant voltage, to thereby actuate the main CPU 10.

Terminals P5, P6, P7, P8 and P9 of the indication CPU 11 are connected to a mode switch SWM, drive switch SWDR, exposure correction switch SWXV, up-switch SWUP and down-switch SWDN, respectively.

The indication CPU 11 operates in accordance with the operative and inoperative states of switches SWM, SWDR, SWXV, SWUP, and SWDN. For instance, exposure modes, including, for example, a programed exposure mode, an automatic exposure mode, and a manual exposure mode, are selected in accordance with the operation of the mode switch SWM. Similarly, drive modes, including, for example, a single shot mode, and a continuous shot mode, are selected in accordance with the operation of the drive switch SWDR. The selection modes can be varied, for example, in accordance with the operation of the up-switch SWUP and down-switch SWDN at a position in which the exposure modes or the drive modes can be selected.

The indication CPU 11 makes it possible to change the exposure correction value when the exposure switch SWXV is turned ON. Namely, the exposure correction value can be increased and decreased in accordance with the operation of the up-switch SWUP and the down-switch SWDN, respectively.

The indication CPU 11 has a group of indication control terminals PSEG that is connected to an indicating LCD 12 through a bus line. The indicating LCD 12 indicates necessary photographing data in accordance with a command of the indication CPU 11 when the lock switch SWL is turned ON.

Seven terminals P10 through P16 of the indication CPU 11 are connected to electrical contacts Fmin1, Fmin2, Fmin3, Fmax1, Fmax2, A/M, and Cont on the body mount BM of the camera body, respectively. Terminal P18 of the indication CPU 11 is connected to a switch circuit 26.

The electrical contacts Fmin1, Fmin2 and Fmin3 also function as communication terminals for data communication between the photographing lens 2 and the indication CPU 11. Namely, the electrical contacts Fmin1, Fmin2 and Fmin3 comprise a serial clock signal inputting and outputting terminal $\overline{SCK}$, a data transmitting and receiving terminal DATA, and a reset signal outputting terminal RES, respectively.

Terminals P10, P11 and P12 of the indication CPU 11 are always pulled up within the indication CPU 11.

The output of the switch circuit 26 is connected to a terminal VBATT, and functions as a switch for establishing and breaking an electrical connection between the battery 22 and terminal VBATT in accordance with the level of terminal P18. Terminal Gnd of the indication CPU 11 is connected to ground terminal Gnd of the battery 22.

The indication CPU 11 and the main CPU 10 communicate with each other through serial terminals SCK, serial-in terminals SI and serial-out terminals SO. In conventional data communication, data is transferred using command codes, as shown in Table 1 below. In Table 1, the left column represents data which is outputted from the indication CPU 11 to the main CPU 10, and the right column represents data which is transferred from the main CPU 10 to the indication CPU 11. This data is set based on the measurements of the object luminance and the object distance, etc. controlled by the main CPU 10.

TABLE 1

| Indication CPU 11 → Main CPU 10 | Main CPU 10 → Indication CPU 11 |
|---|---|
| Mode Setting Data | Indication Tv, Sv data |
| Drive Setting Data | Film Sensitivity Data |
| Exposure Correction Setting Data | AF Accommodation Pulse No. Data |
| Lens CPU Data | AF Return Completion Data |
| Setting TV, SV Data | |
| AF Accommodation Data | |
| AF Return Code | |
| AF Return Pulse No. Data | |
| AF Accommodation and Return Codes | |

Contact groups PA, PB, PC, PD, PE and PF of the main CPU 10 are connected to an A/D converter 15, the exposure control circuit 16, the CCD processing circuit 18, the AF motor control circuit 20, the AF pulser 21, and the DX code input circuit 13, respectively.

Terminal P20 of the main CPU 10 is connected to first AF switch SWAF1, which selects an auto focus mode in which focusing is automatically affected by the AF motor 19 and a manual focus mode in which focusing is manually affected by a photographer. Terminal P21 of the main CPU 10 is connected to a second AF switch SWAF2, which switches the mode of the shutter release between a focus priority mode and a release priority mode. The first and second AF switches SWAF1 and SWAF2 are mechanically associated with each other, so that for example, when the manual focus mode is selected by the first AF switch SWAF1, the second AF switch SWAF2 is switched to the release priority mode. Namely, when the first AF switch SWAF1 is turned ON, the second AF switch SWAF2 is turned OFF.

Circuit of Photographing Lens

Figure 2:
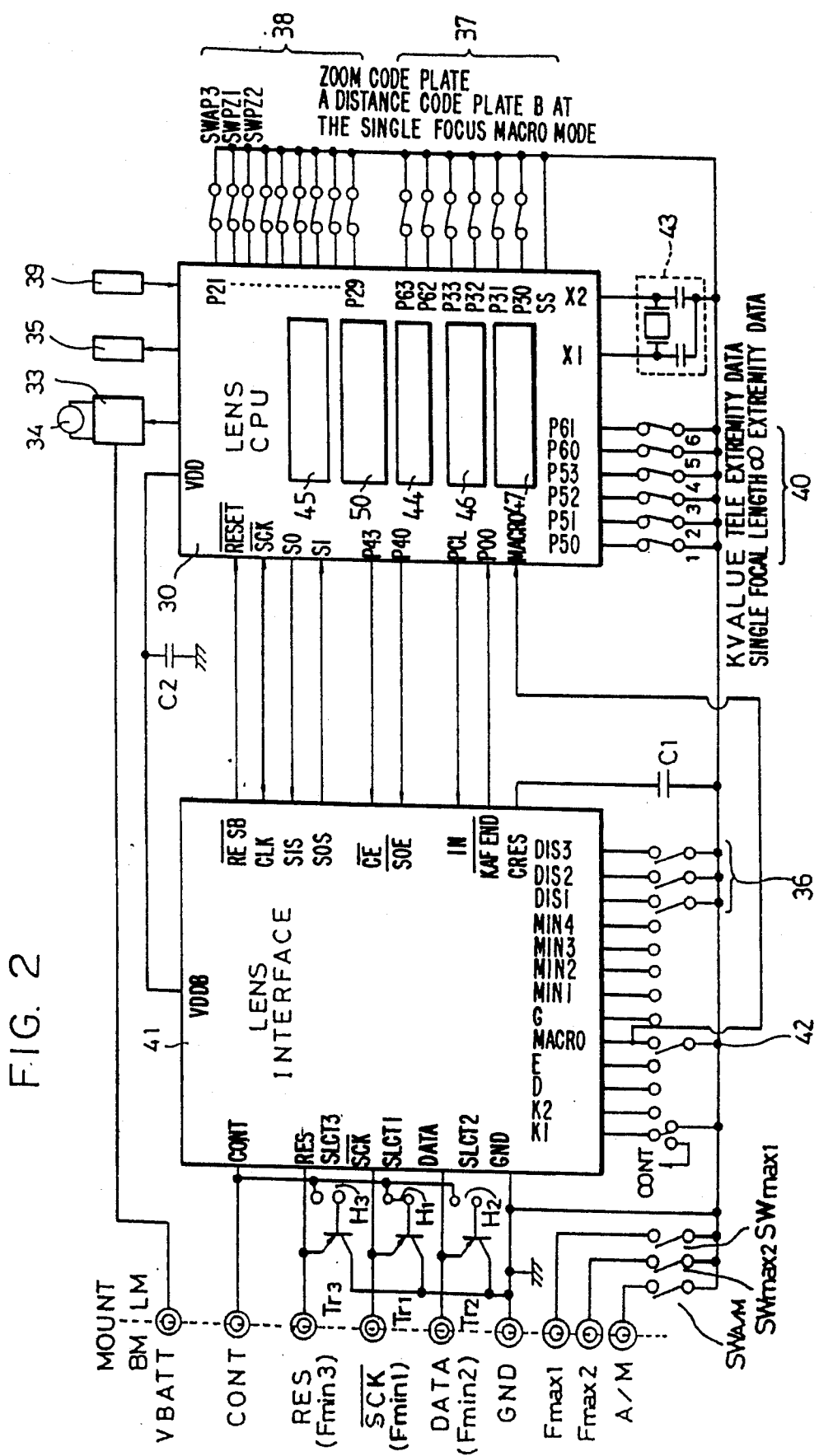
FIG. 2 is a block diagram of a main circuit arrangement of a photographing lens shown in FIG. 1.

The circuit arrangement of the electrical system provided in the photographing lens 2 will now be explained below, with reference to FIG. 2.

The lens mount LM of the photographing lens 2 is provided with electrical contacts VBATT, CONT, RES (Fmin3), $\overline{SCK}$ (Fmin1), DATA (Fmin2), GND, Fmax1, Fmax2 and A/M, which correspond to the associated electrical contacts provided on the body mount BM when the photographing lens 2 is attached to the camera body 1. Although the arrangement of the electrical contacts of the lens mount LM is not identical to that of the body mount BM, for the purpose of clarification, the electrical contacts of the lens mount are electrically connected to the corresponding electrical contacts of the body mount with the same reference numerals.

Contact VBATT on the lens side is connected to the PZ driver 33, so that the power of the battery 22 is directly supplied to the PZ motor 34 through the contact VBATT by the switching operation of the PZ driver 33.

Contacts Fmax1 and Fmax2 of the lens side also function as a steady information transmitting means for transmitting a maximum F-number data of two bits to the camera body, similar to those provided on a conventional AE lens. Namely, contacts Fmax1 and Fmax2 on the lens side are grounded through switches SWmax1 and SWmax2, so that maximum F-number (minimum diaphragm value) data is formed in accordance with a combination of the levels of the switches SWmax1 and SWmax2 depending on the ON/OFF states thereof. The combinations of the levels of contacts Fmax1 and Fmax2 on the lens side and the maximum F-number are shown, by example, in Table 2 below:

TABLE 2

| F NO. | Fmax2 | Fmax1 |
| --- | --- | --- |
| 22 | 0 | 0 |
| 32 | 0 | 1 |
| 45 | 1 | 0 |

Contact A/M on the lens side functions to send auto/manual information of the diaphragm to the camera body 1. This contact is grounded through a selection switch SWA/M. The selection switch SWA/M operates in association with the rotation of a diaphragm ring (not shown) of the photographing lens 2, so that when the diaphragm ring is in the auto position and the manual position, the selection switch is turned ON and OFF, respectively.

Contacts Fmin1, Fmin2, and Fmin3 on the lens side function not only as a steady information transmitting means for transmitting the open (minimum) F-number information of three bits to the camera body 1, similarly to those provided on an existing (old) AE lens, but also as data communication contacts between the camera body and the photographing lens. The relation between the levels of the contacts Fmin1, Fmin2 and Fmin3 on the lens side and the minimum F-number is shown, by example, in Table 3 below:

TABLE 3

| F NO. | Fmin3 | Fmin2 | Fmin1 |
| --- | --- | --- | --- |
| 1.4 | 0 | 0 | 0 |
| 1.7 | 0 | 0 | 1 |
| 2 | 0 | 1 | 0 |
| 2.5 | 0 | 1 | 1 |
| 2.8 | 1 | 0 | 0 |
| 3.5 | 1 | 0 | 1 |
| 4 | 1 | 1 | 0 |
| 4.5 | 1 | 1 | 1 |

To provide both the steady information transmitting function and the data communication function on the contacts Fmin1, Fmin2 and Fmin3 on the lens side, these contacts are connected to PNP transistors Tr1, Tr2 and Tr3, respectively. The PNP transistors Tr (Tr1, Tr2 and Tr3) are connected at the emitters thereof to the lens contacts Fmin1, Fmin2 and Fmin3, and at the bases thereof to contact CONT through fuse portions H1, H2 and H3, so as to establish and break the connection, respectively. The collectors of the transistors are grounded. It is possible to provide the fuse portions H1, H2 and H3 between the emitters and the lens contacts Fmin (Fmin1, Fmin2 and Fmin3).

The indication CPU 11 causes a voltage at contact CONT to drop to ground in order to obtain the open F-number data from the lens contacts Fmin1, Fmin2 and Fmin3. As a result, a transistor (or transistors) Tr to which the fuse portion(s) is (are) connected is (are) turned ON, so that the emitter(s) of the transistor(s) which has (have) been turned ON become(s) a high level "H", and the emitter(s) of the transistor(s) which has (have) not been turned ON become(s) a ground level or low level "L". Namely, the transistors Tr are selectively turned or OFF in accordance with the connection of the fuse portions H1, H2 and H3 so as to change the level of the emitters thereof. Consequently, the three-bit open F-number data is output to the lens contacts Fmin1, Fmin2, and Fmin3.

Terminals CONT, RES, $\overline{SCK}$, DATA and GND of the lens interface 41 is connected to terminals CONT, Fmin3, Fmin1, Fmin2 and GND on the lens side, respectively.

Lens contact CONT is connected to the bases of the transistors Tr and to terminal CONT of the lens interface 41, as mentioned above. The switching of the power supply from terminal CONT of the lens interface is affected through the lens terminal Fmin3. After the data on the open F-number is transferred, when terminals CONT and RES (lens terminal Fmin3) become levels "H" and "L", respectively, power is supplied to the lens CPU 30.

Terminal VDDB of the lens interface 41 is connected to terminal VDD of the lens CPU 30 through capacitor C2, so that a constant voltage supplied from the terminal CONT of the camera body 1 is also supplied to the lens CPU 30.

Terminals DIS1, DIS2 and DIS3 of the lens interface 41 are connected to a distance code plate 36, so that distance data signals of an object distance corresponding to the position of the focusing cam ring driven by the focusing mechanism 31 are inputted to terminals DIS1, DIS2 and DIS3.

Terminal MACRO of the lens interface 41 is connected to macro code portion 42, which functions as a macro switch and which is turned ON when the zoom operation ring is actuated to switch the photographing lens 2 to the macro mode.

The input and output terminals of the lens interface 41 are connected to corresponding input and output terminals of the lens CPU 30. Reset terminal $\overline{RESB}$, clock terminal CLK, serial-in terminal SIS, serial-out terminal SOS, terminal $\overline{CE}$, terminal $\overline{SOE}$, terminal $\phi$ IN, and terminal $\overline{KAFEND}$, of the lens interface 41 are connected to reset terminal $\overline{RESET}$, serial clock terminal $\overline{SCK}$, serial-out terminal SO, serial-in terminal SI, terminal P43, terminal P40, terminal PCL, and terminal POO, of the lens CPU 30, respectively. Terminal CRES of the lens interface 41 is grounded through a delay capacitor C1.

Lens CPU 30 controls a PZ driver 33 that is connected to a control terminal thereof. The lens CPU 30 is also connected to a PZ pulser 35 and a lens discriminating code 39 which outputs data with regard to the lens type (old lens, new lens, etc.).

Terminals P30, P31, P32 and P33 and terminals P62 and P63, of the lens CPU 30 are connected to codes of a zoom code plate 37 (position detecting means). The zoom code plate 37 functions as a second distance code plate B at the single focus macro mode.

Terminals P21 through P29 are connected to various switches, including the automatic focusing switch SWAF and the power zoom switches SWPZ1 and SWPZ2, etc. Terminals P50 through P53, P60 and P61 of the lens CPU 30 are connected to data setting portion 40.

Lens CPU 30 includes a lens judging means 45, a data storing means 46, a data table 47, a telephoto extremity focal length storing means 50, and an arithmetic operating means 44.

The lens judging means 45 determines whether the attached lens is an old lens or a new lens, a zoom lens, a single focus lens, or a single focus macro lens etc., in accordance with the data of the lens discriminating code 39. An old lens does not have a lens CPU. On the other hand, a new lens contains a lens CPU therein. A new lens is illustrated in FIGS. 1 and 2.

The data storing means stores a common ratio and a common difference for geometrically and arithmetically dividing a focal length range of the photographing lens 2. The data storing means stores gradients "$m_1, m_2$" which respectively show the minimum $A_v$ value and the maximum $A_v$ value, and the minimum $A_v$ value "$A_v$ minW" at the wide angle extremity (or "$A_v$minT" at the telephoto extremity). Furthermore, when the photographing lens 2 is a macro lens, the data storing means 46 stores a common ratio for geometrically and arithmetically dividing the focal length range of the macro lens.

Coefficient data $(r^x)^2$ necessary for calculating the K VALUE corresponding to the photographing lens is pre-stored in the data table 47 as Tables 1 and 2.

The telephoto extremity focal length storing means 50 stores the focal length of the photographing lens at the telephoto extremity.

The arithmetic operating means 44 calculates the focal length and the drive pulse coefficient K VALUE's at respective focal length steps upon zooming, and the K value at macrophotographing in accordance with the determination of the lens by the lens judging means 45, the levels of terminals P30 through P33, P62 and P63, the K VALUE of the data setting portion 40 at the telephoto extremity, and the K VALUE at the single focus macro mode, and stores the calculated data in a RAM. Furthermore, the arithmetic operating means 44 designates the addresses for the data on gradients "$m_1$, $m_2$", the maximum and minimum $A_v$ values at the wide angle extremity. Then, when necessary, by using the data, the arithmetic operating means 44 calculates the maximum $A_v$ value and the minimum $A_v$ value.

The photographing lens 2 has a clock pulse generating circuit 43 that is connected to clock terminals X1 and X2 of the lens CPU 30. The lens CPU 30 operates synchronously with the clock pulses generated by the clock pulse generating circuit 43.

As mentioned above, on the camera body side, after terminal CONT drops to level "L" and the open F-number is read, both the terminals CONT and RES (Fmin3) become level "H" so as to reset the lens CPU 30.

When the reset is released, the lens CPU 30 begins the old communication in accordance with the clock pulses of the camera body 1. This communication is carried out by the lens interface 41. In the illustrated embodiment, 19 bytes of data is sent to the camera body 1.

Upon completion of the communication, terminal $\overline{\text{KAFEND}}$ of the lens interface 41 becomes level "L", which comprises a communication completion signal. Consequently, the lens CPU 30 waits for renewal data of the communication from the camera body 1.

When the lens CPU 30 receives the renewal communication data from the camera body 1, terminal DATA (Fmin2), which has been at level "H" becomes level "L" and then becomes level "H" again, so that the camera body can commence the new communication. Note that terminal CONT is held HIGH and terminal RES is held LOW when the lens CPU 30 is first activated.

The new communication which commences upon completion of the old communication is carried out directly between the lens CPU 30, the indication CPU 11 and the main micro computer 10 without the lens interface 41. The data is transmitted from the lens CPU 30 to the main micro computer 10 and the indication CPU 11 or from the main micro computer 10 and the indication CPU 11 to the lens CPU 30, in accordance with the command code of the indication CPU 11. An example of the data communication between camera body 1 and photographing lens 2 is shown in Table 4.

The new data communication is affected synchronously with the clock pulse output from the photographing lens 2.

TABLE 4

| Lens → Camera Body | |
|---|---|
| AF Data | 0011.0001 (31H) |
| AE Data | 0011.0010 (32H) |
| All Data | 0011.0011 (33H) |
| Every One Byte | 1010.XXXX (5XH) |
| Lens Data 1 | 0110.0000 (60H) |
| Lens Data 2 | 0110.0001 (61H) |
| Camera Body → Lens | |
| Focal Length Data fWide | 0110.0010 (62H) |
| Focal Length Data fTele | 0110.0011 (63H) |
| Focal Length Data fX(present) | 0110.0100 (64H) |
| Lens Drive Data | 0110.0110 (66H) |
| Lens Accommodation | 1001.0010 (90H) |
| Lens Return | 1001.0001 (91H) |
| PH ON | 1001.0010 (92H) |
| PH OFF | 1001.0011 (93H) |

| | Lens Data 1 60H | Lens Data 2 61H | Lens Drive Data 66H |
|---|---|---|---|
| Bit 7 | PH Demand | Lens CPU | fW extremity |
| Bit 6 | AF A/M | | fT extremity |
| Bit 5 | PZ A/M | Lens Internal PZ | |
| Bit 4 | PZ P/A | | |
| Bit 3 | PZ MODE | | PZ Far |
| Bit 2 | SET SW | | PZ Near |
| Bit 1 | Lens A/M | Lens | |
| Bit 0 | Lens O/C | Version | |

Calculation of Exposure Data on Diaphragm

The following discussion will be directed to the calculation of exposure data, such as a minimum Av values or a maximum Av values, by the arithmetic operating means 44.

Figure 4:
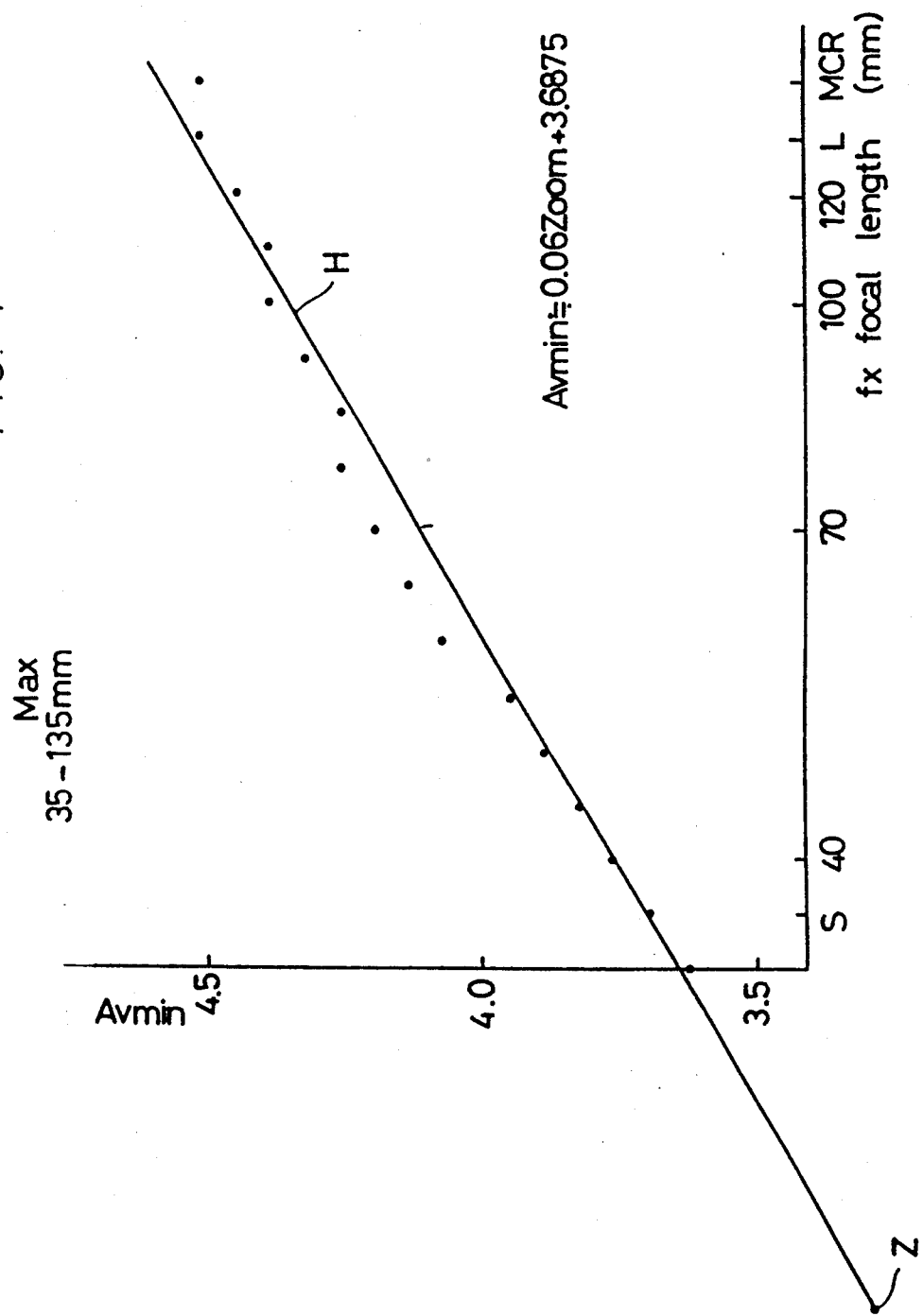
FIG. 4 is a diagram showing a relationship between focal lengths and exposure data.

FIG. 4 is a diagram showing the relationship between the focal length of the zoom lens, in which the focal length varies within a range of 35 mm through 135 mm, and the minimum Av value thereof. In the diagram of FIG. 4, the abscissa represents a focal length "fx" and the ordinate represents a minimum Av value "Avmin", respectively.

Straight line "H" in FIG. 4, which is a linear function, intersects the ordinate "Avmin" at a value of 3.6875. The focal lengths and the minimum Av values corresponding thereto are in a substantially linear relationship. Although the minimum Av values at the corresponding focal lengths are not accurately on the line "H" and are scattered near the line "H", the approximate values of the minimum Av values for the corresponding focal lengths are obtained from the points on the line "H". In the present invention, the approximate values are corrected to be used as exposure data.

The linear function of the straight line "H" is represented by the following formula:

$$Avmin = m_1 \cdot f_x + 3.6875 \quad (A)$$

where $m_1$ designates a gradient of the line "H".

From this, the gradient ml is given by the following equation:

$$m_1 = (Avmin - 3.6875)/f_x \quad (B)$$

The gradient "m1" depends on the photographing lens mounted to the camera body and is stored in a ROM (data storing means 46) of each new lens to be used in the new communication.

The Av values become small and large at the wide angle extremity side and a telephoto extremity side, respectively. Accordingly, a minimum Av value "Avmin" is obtained from the following equation:

$$Avmin = AvminW + \Delta Avmin \cdot f_x \quad (C)$$

where "AvminW" designates a diaphragm F number at the wide angle extremity (the intersecting value 3.6875 in formula (A), "$\Delta Avmin$" designates the variation of the minimum Av value, and "fx" designates the focal length, respectively.

Similarly, the maximum Av value "Avmax" is obtained by the following equation (D):

$$Avmax = AvmaxW + \Delta Avmax \cdot f_x \quad (D)$$

where "AvmaxW" designates a maximum, Av value at the wide angle extremity, "$\Delta Avmax$" designates the variation of the maximum Av value, and "$f_x$" designates the focal length, respectively.

Since "$\Delta Avmin$" and "$\Delta Avmax$" are identical to the gradients "$m_1$" and "$m_2$"; equations (C) and (D) can be substituted by the following equations, respectively:

$$Avmin = AvminW + m_1 \cdot f_x \quad (E)$$

$$Avmax = AvmaxW + m_2 \cdot f_x \quad (F)$$

The gradients m1 and m2, and the minimum Av and the maximum Av at the wide angle extremity are stored as data that is peculiar to the photographing lens and are fetched by designating the corresponding addresses in the data storing means 46 in accordance with a need when the arithmetic operating means 44 calculates the minimum Av value "Avmin" or the maximum Av value "Avmax" on the basis of equations (E) and (F) mentioned above.

The data calculated by the arithmetic operating means 44 is stored in a RAM of the lens CPU and is transmitted to the main micro computer 10 and the indication CPU 11 without going through the lens interface 41 in the new communication.

Accordingly, it is not necessary to directly store the data, such as the maximum Av values and the minimum Av values in the data storing means 46. In accordance with a need, the minimum Av values and the maximum Av values can be easily calculated by the arithmetic operating means 44, on the basis of the data, including the gradients $m_1$ and $m_2$, and the minimum Av value AvminW and the maximum Av value AvmaxW at the wide angle extremity, stored in the storing means 46.

Although the minimum Av value AvminW and the maximum Av value AvmaxW at the wide angle extremity are used in the above mentioned embodiment, it is possible to use a minimum Av value AvminT and a maximum Av value AvmaxT at the telephoto extremity. In this alternative, the values of "Avmin" and "Avmax" can be obtained by the following equations:

$$Avmin = AvminT + m_1 \cdot f_x$$

$$Avmax = AvmaxT + m_2 \cdot f_x$$

Although the exposure data to be calculated are the maximum Av values and the minimum Av values in the illustrated embodiments, the exposure data to be calculated is not limited thereto and can be, for example, effective aperture data of the lens, etc.

In the present invention, since the values of "Avmin" and "Avmax" are calculated based on the stored data peculiar to the photographing lens, using equations (E) and (F), ineffective data, such as data at point "Z" in FIG. 4 can be calculated. Accordingly, it is also possible to use a simpler linear function represented by the following equation:

$$Avmin = m_1 \cdot f_x$$

In this equation, point "Z" is a reference point (origin) of the straight line "H". That is, there is no value "3.6875", unlike equation (A). This contributes to a reduction of the calculation speed of the arithmetic operating means 44.

Calculation of Focal Length

The following discussion will be directed to the arithmetic operating means calculation of focal length in both the zooming and macro modes.

First, zooming ratio R of the photographing lens 2, used to geometrically divide the code of the distance code plate 37 (also referred to as a distance code plate B) into n-codes, is obtained by the following equation:

$$R = f_T / f_w \quad (1)$$

where $f_T$ designates a focal length of the lens at a telephoto extremity and $f_w$ designates a focal length of the lens at a wide angle extremity, respectively.

Then, common ratio r satisfies the following equation when the code of the zoom code plate 37 of the photographing lens 2 is geometrically divided into n-codes with reference to the telephoto extremity:

$$R = r^{n-1} \quad (2)$$

From equation (2) above, we have;

$$r = \sqrt[n-1]{R} \quad (3)$$

Accordingly, focal length fx at a position x of the zoom ring ($0 \leq x \leq n-1$, where "0" designates the telephoto extremity and "n−1" designate the wide angle extremity) is determined by the following equation:

$$f_x = f_T / r^x \quad (4)$$

Since the zoom code plate 37 (distance code plate B) corresponding to the zoom ring position x has a certain width (band) of codes in which there is no change of code, in case of a slight angular displacement of the zoom ring, it is necessary to geometrically position the focal length $f_x$ corresponding to position x at an intermediate position of the zoom code plate 37. To this end, changing points of the zoom code plate 37 are obtained as follows:

$$f_{x-x+1} = f_T / r^{x+0.5} \tag{5}$$

where $f_{x-x+1}$ is the focal length at a changing point between a zoom code position x and a zoom code position (x+1) adjacent thereto.

Since the calculation is carried out by the arithmetic operating means 44, the memory of the ROM can be reduced, in comparison with the memory of the ROM in which the focal lengths for every divided code by the zoom code plate 37(distance code plate B) must be stored.

Upon arithmetically dividing the zoom code plate 37 into n-codes, a common difference d can be obtained as follow:

$$F_{dif} = f_T - f_w. \tag{6}$$

$$d = f_{dif}/(n-1) \tag{7}$$

$$f_x = f_T - d_x \tag{8}$$

where $f_{dif}$ designates the actual amount of zooming, and $f_T$ designates the focal length at the telephoto extremity.

Therefore, the changing point can be obtained by the following equation:

$$f_{x-x+1} = f_T - d(x+0.5) \tag{9}$$

Figure 5:
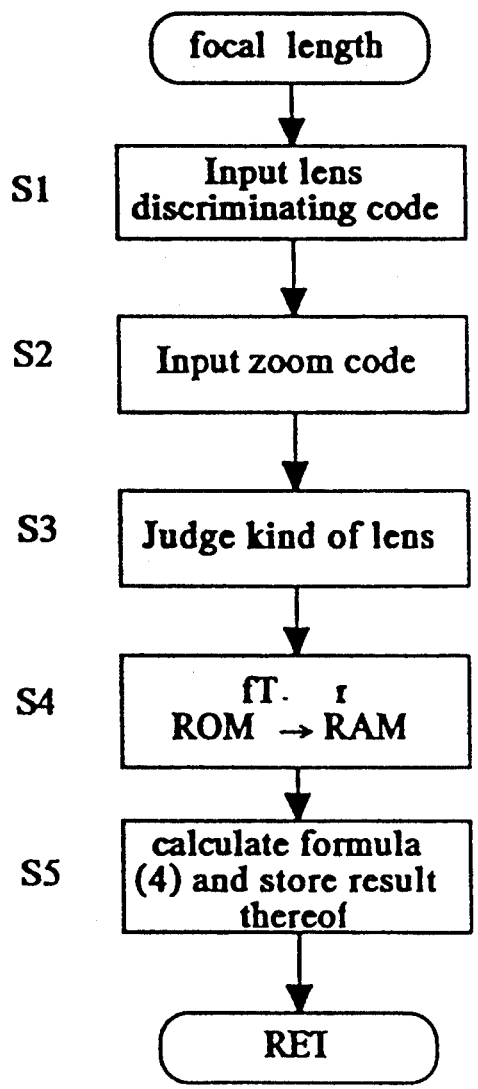
FIG. 5 is a flow chart of arithmetic operations of the focal length performed by the camera of FIG. 1.
Figure 6:
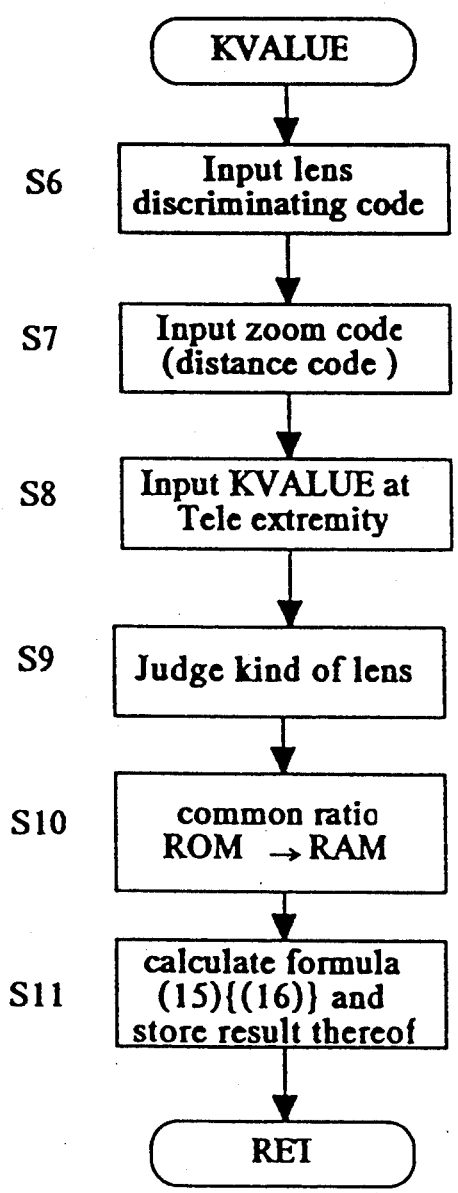
FIG. 6 is a flow chart of arithmetic operations of a drive pulse coefficient K value.

This will be explained below with reference to a flow chart of the operations shown in FIG. 5.

In step S1, the lens CPU 30 receives the discrimination code inputted thereto for discriminating the kind of mounted lens from the lens judging code plate 39.

Thereafter, the zoom code data corresponding to the optional zoom ring position x is inputted from the zoom code 37 (distance code plate B) to the lens CPU 30, in step S2.

In step S3, the lens judging means 45 judges whether the photographing lens mounted to the camera body 1 is an old lens or a new lens, a zoom lens, a single focus lens or a single focus macro lens, in accordance with the data of the lens judging code plate 39.

Thereafter, in step S4, the data of the focal length "$f_r$" in the telephoto extremity and the common ratio "r" thereof are sent to the RAM from the telephoto extremity focal length storing means 50 in accordance with the determination of the lens judging means 45. Although the focal length "$f_r$" at the telephoto extremity is used as data for calculation, purposes it is possible to use the focal length in the wide angle extremity or any reference focal length other than those in the telephoto extremity and the wide angle extremity.

In step S5, the arithmetic operating means 44 calculates the focal length which is geometrically (or arithmetically) divided correspondingly to the lens, in accordance with the data obtained in step S4, based on equation (4) mentioned above, and the calculation result that is obtained is stored in the RAM. The calculated data of the focal length is directly transmitted as new communication to the main micro computer 10 and the indication CPU 11, without going through the lens interface 41.

Calculation of K VALUE at Zooming

Calculation of the K value (automatic focusing drive pulse coefficient) used in the zooming operation is performed by the arithmetic operating means 44.

In the following description, "K" designates the K value at a focal length F, "G" designates a gear ratio of the focusing mechanism 31 in the photographing lens 2, "P" designates a number of pulses when the coupler 19a on the camera body side rotates by one turn, "L" designate a lead (mm) of a focusing helicoid, i.e., the displacement when the helicoid rotates by one turn, "F" designates a FL conversion coefficient, i.e., the ratio between the displacement of the lens and the displacement of the image plane, and "$f_T$" designates a focal length at the telephoto extremity.

The K value "K" can be obtained by the following equation:

$$K = \frac{G \times P \times F}{L} \tag{10}$$

Since the photographing lens 2 is a zoom lens, the focal length "F" is determined by the following formula;

$$F = \left(\frac{f_T}{f_x}\right)^2 \tag{11}$$

where $f_x$ is the focal length at the position x of the zoom ring, and $f_T$ is the focal length at the telephoto extremity.

From equations (10) and (11), K value "$K_x$" at the zoom ring position x (the x-th focal length step from the telephoto extremity) is obtained by formula (12) below:

$$K_x = \frac{G \times P \times \left(\frac{f_T}{f_x}\right)^2}{L} \tag{12}$$

K value "$K_T$" at the telephoto extremity is obtained by the following equation (13):

$$K_T = \frac{G \times P \times 1}{L} \tag{13}$$

From equations (12) and (13) mentioned above, we have:

$$K_x = K_T \times \left(\frac{f_T}{f_x}\right)^2 \tag{14}$$

From equations (14) and (4), "$K_x$" in a geometrical division and an arithmetic division can be obtained by the following equations, respectively:

$$K_x = K_T \times (r^x)^2 \tag{15}$$

$$K_x = K_T \times \left(\frac{f_T}{f_x - d_x}\right)^2 \tag{16}$$

When the K value is determined in accordance with equations (15) and (16), two methods are used: (a) the common ratio is directly used as data for calculation, and (b) the coefficient obtained based on the common ratio is pre-stored in the ROM (data table 47) as data corresponding to each code step of the zoom ring position, so that the stored data is fetched from the data table 47 to calculate the K value.

The first method (a) mentioned above will be first explained below, with reference to the flow chart of FIG. 5.

In step S6, the discrimination code is inputted from the lens judging code plate 39 to determine the type of lens. Thereafter, the zoom code (or the distance code in the case of a single focus macro lens) in the zoom ring position x (the x-th focal length step from the telephoto extremity) is inputted from the zoom code plate 37(the distance code plate B).

In step S8, the K value at the telephoto extremity (or infinite object distance in case of a single focus macro lens) is inputted from the pin.

Thereafter, the lens judging means 45 determines the type of photographing lens required in accordance with the lens discrimination code from the lens judging code plate 39 in step S9.

In step S10, the common ratio "r" (or "a" in the case of a single focus macro lens) corresponding to the photographing lens mounted to the camera body 1 is transferred to the RAM from the data storing means 46.

Thereafter, the arithmetic operating means 44 calculates the K value at the zoom ring position x, based on the equations (15) and (16) in step S11. The calculated data is then stored in the RAM. Thereafter, the control returns. This means that the calculation of the K value "$K_x$" is in accordance with the K value "$K_T$" which is steady data inputted from the micro computer port (pin) in the telephoto extremity, the common ratio "r" which is ROM data in the lens CPU 30, and the steady data "x" of the zoom code plate.

The data "$K_x$" thus obtained is directly sent to the main micro computer 10 and the indication CPU 11 as new communication without going through the lens interface 41. The micro computer 10 controls the photographing lens 2 in accordance with the data "$K_x$" input thereto.

Figure 7:
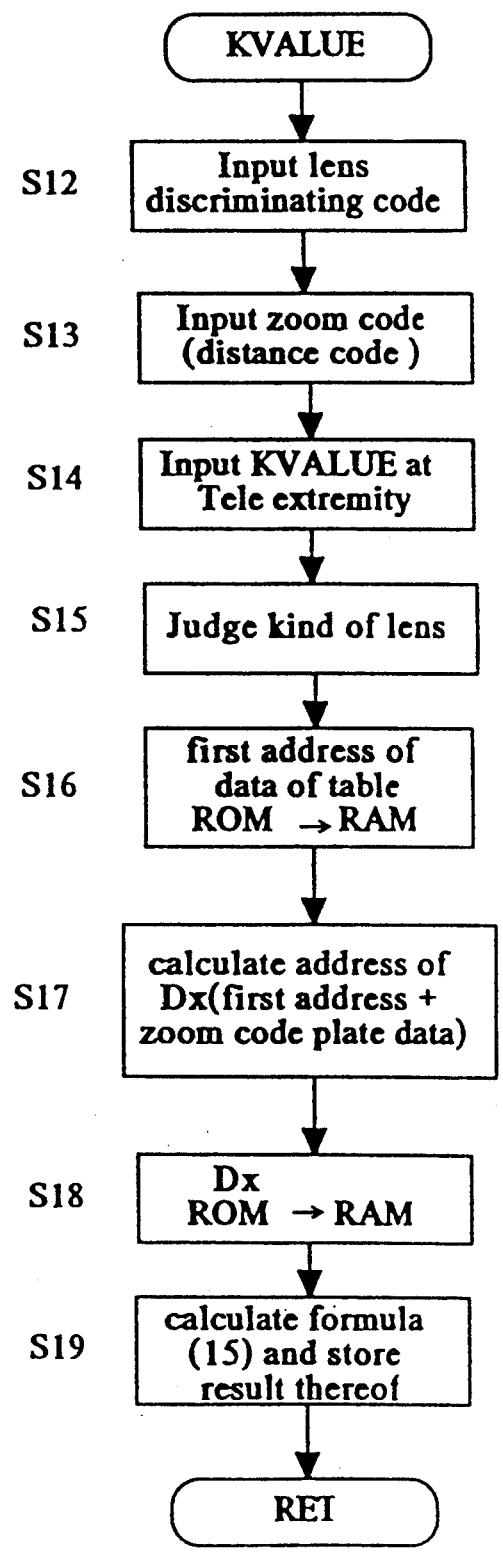
FIG. 7 is a flow chart of arithmetic operations of the drive pulse coefficient K value according to another embodiment of the present invention.

On the other hand, in the case of method (b) mentioned above, the discrimination code is inputted from the lens judging code plate 39 to determine the type of photographing lens 2, in step S12 (FIG. 7).

In step S13, the zoom code (or the distance code in case of a single focus macro lens) in the zoom ring position is inputted from the zoom code plate 37.

In step S14, the K value in the telephoto extremity (or infinite object distance in the case of a single focus macro lens) is inputted from the data setting portion 40.

Thereafter, the lens judging means 45 determines the type of the photographing lens in accordance with the lens discrimination code from the lens judging code plate 39 in step S15.

In steps S16 and S17, the data table (Table 5 or 6) to be used is selected, and the first address (or the first address + zoom code plate data in the case of a single focus macro lens) of the data "$D_x$" of the required value "$(r^x)^2$" is calculated. The value "$D_x$" is fetched from the selected data table and is stored in the RAM in step S18.

Thereafter, the arithmetic operating means 44 calculates the drive pulse coefficient K value, based on equation (10) in step S19. The calculated data is stored in the RAM. Thereafter, control returns. Namely, a predetermined number of parts "$(r^x)^2$" of equation (15) corresponding to the number of divided focal length steps of the zoom ring is stored in the ROM only as a table data so as to selectively use the data, depending on the kind of photographing lens mounted to the camera body.

Calculation method (b) mentioned above will be explained below in more detail, with reference to the calculation of the K value, based on a 4 bit signal inputted from the zoom code plate 37, by way of examples. In the examples below, the data tables are divided into 16 ($2^4 = 16$) segments. Note that $r = 1.09375$ in Table 5 and $r = 1.125$ in Table 6. The four bit signals are inputted from the zoom code plate 37. In the embodiments, the K value is calculated based upon the four bit signals, which means that a maximum of 16 ($2^4 = 16$) different data can be recorded. Thus, Tables 5 and 6 are divided into 16 parts. However, it is not necessary to use all 16 parts, because an exchanged-photographing lens requires different numbers (amount) of data, just up to the minimum amount necessary for the zooming ratio of the lens.

In case of "a photographing lens having a zoom ratio of 3", the value ($r^x$) in formula (15) for Table 5 in which $r = 1.09375$ is as follows. In formula (15), $K_X = K_T X (r^x)^2$. The K value can be obtained using the known value $K_T$, which corresponds to the X-th from "0" in Table 5. The procedure involves finding the value of "x" that is infinitely close to "3" (which is the zoom ratio of the lens). In other words, $(r^x)^2 \approx 3$. As a result of calculation, one finds that $(r^{12})^2 \approx (2.93)^2 \approx 3^2$. As shown in ($r^{12}$), the data from 0 to 12th (in Table 5), which means 13 different data, are sufficient for a photographing lens having a zoom ratio of 3.

Consequently, the zoom code is divided into 13 segments.

In case of "a photographing lens having a zoom ratio of 4", the value ($r^x$) in formula (15) for Table 6 in which $r = 1.125$ is as follows. In formula (15), $K_X = K_T X (r^x)^2$. The K value can be obtained using the known value $K_T$, which corresponds to the X-th from "0" in Table 6. The procedure involves finding the value of "x" that is infinitely close to "4" (which is the zoom ratio of the lens). In other words, $(r^x)^2 \approx 4$. As a result of calculation, one finds that $(r^{12})^2 \approx (4.11)^2 \approx 4^2$. As shown in ($r^{12}$), the data from 0 to 12th (in Table 6), which means 13 different data, are sufficient for a photographing lens having a zoom ratio of 4.

Consequently, the zoom code is divided into 13 segments. Namely, when the value $K_x$ is calculated, based on the telephoto extremity K value and the value $D_x$ which are port data $K_T$ of the micro computer, based on formula (15), the following equation is satisfied:

$$K_x = K_T \times M_x \qquad (17)$$

where $M_x$ is ROM data at the position x.

TABLE 5

| ADDRESS1 | r = 1.09375 |
|---|---|
| 0 | $1.09375^0$ |
| 1 | $1.09375^2$ |
| 2 | $1.09375^4$ |
| 3 | . |
| 4 | . |
| 5 | . |
| 6 | . |
| 7 | . |
| 8 | . |
| 9 | . |
| 10 | . |
| 11 | |

TABLE 5-continued

| ADDRESS1 | r = 1.09375 |
|---|---|
| 12 | . |
| 13 | . |
| 14 | . |
| 15 | . |

TABLE 6

| ADDRESS2 | r = 1.125 |
|---|---|
| 0 | $1.125^0$ |
| 1 | $1.125^2$ |
| 2 | $1.125^4$ |
| 3 | . |
| 4 | . |
| 5 | . |
| 6 | . |
| 7 | . |
| 8 | . |
| 9 | . |
| 10 | . |
| 11 | . |
| 12 | . |
| 13 | . |
| 14 | . |
| 15 | . |

Calculation of K value in Single Focus Macro Lens

There are two methods of calculation of the K value by the arithmetic operating means 44, similar to the case of the zooming mentioned above. In the following example, the object distance code is geometrically divided into n-codes.

The common ratio "a" is given by the following formula:

$$a = \sqrt[2(n-1)]{\frac{K_N}{K_\infty}} \quad (18)$$

where "$K_N$" is the K value at a NEAR extremity of the macro lens, and "$K_\infty$" is the K value at a infinite object distance.

The common ratio "a" is stored in the data storing means 46 of the lens CPU 30 and is outputted to the arithmetic operating means 44 at an that is designated upon calculation of the K value.

When the code of the distance code plate B is geometrically divided into n-codes, a K value "Ky" at an optional object distance "y" ($0 \leq y \leq n-1$) of the macro lens is obtained by the following equation:

$$Ky = K_{28} \times (a^y)^2 \quad (19)$$

The example below is directed to a 2.8/50 mm macro lens that is mounted to the camera body 1, in which the code of the distance code plate B is divided into 6 codes.

Figure 8:
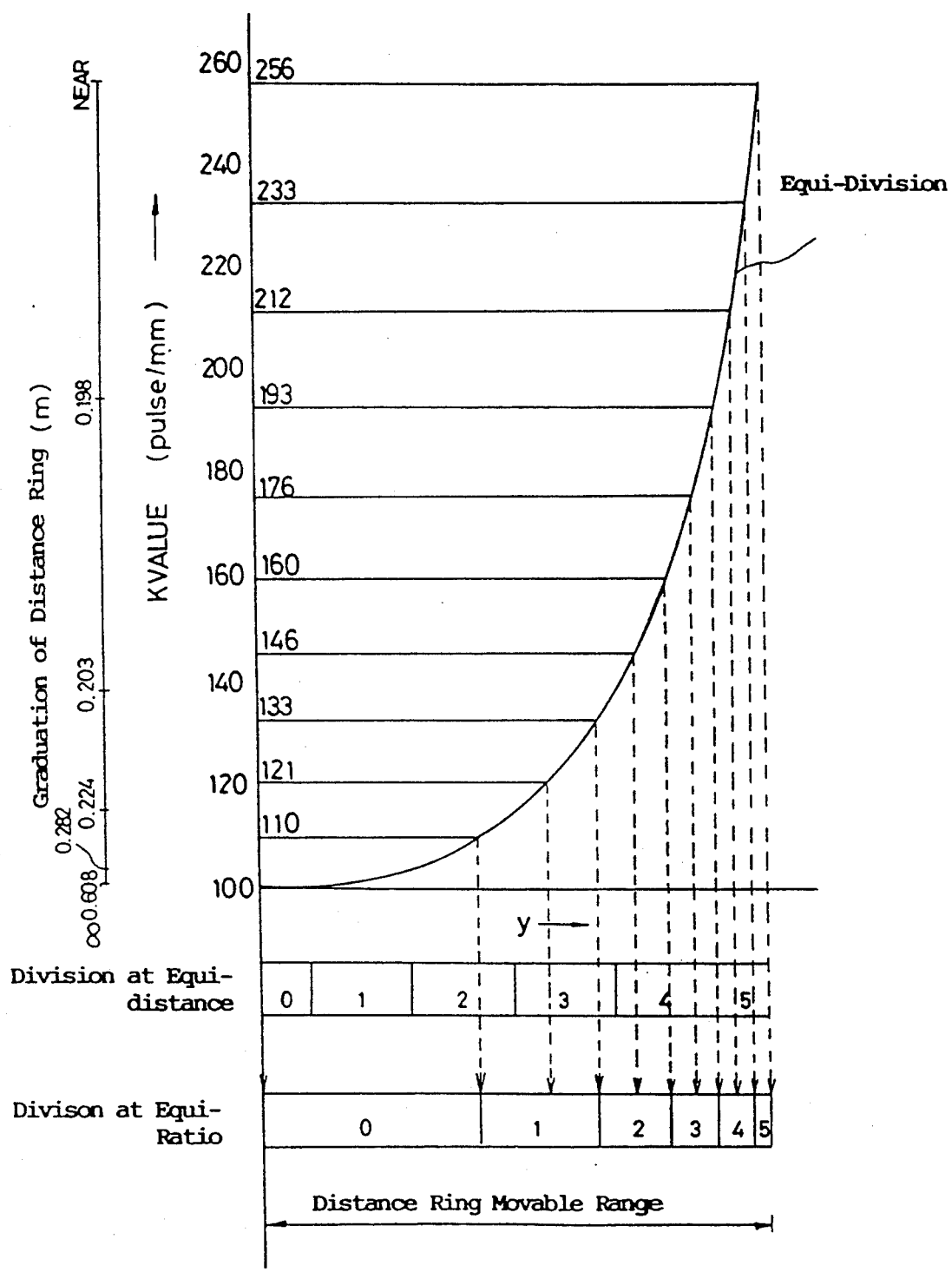
FIG. 8 is a diagram showing the relationship between the variation of the K value and the movable range of a distance ring; and, FIG. 9 is a flow chart of arithmetic operations of the drive pulse coefficient K value of a single focus macro lens.

FIG. 8 shows a diagram in which the abscissa represents a code number of the distance code plate B which is equally divided into six (No. 0 through 5); the ordinate, the K value, and the position "y" (object distance) of the distance ring correspond thereto.

If $Kn = 256$, $K_\infty = 100$, $n = 6$, we have from the equation (18):

$$a = \sqrt[2(6-1)]{\frac{256}{100}}$$

= 1.09856 (common ratio)

The common ratio (1.09856) which is stored in the data storing means 46 is outputted to the arithmetic operating means 44 at an address designated upon calculation of the K value by the arithmetic operating means 44.

When the common ratio of 1.09856 is inputted into the arithmetic operating means 44, the K value Ky at the object distance "y" can be obtained from equation (19):

$$Ky = 100 \times (1.09856^3)^2 \approx 176$$

Since the value "Ky" is an intermediate value of the distance code plate B in a geometrical division, the object distance "y" (from the distance code plate B and the K value ($Ky - y + 1$) at the changing point ($y + 1$)) is obtained by the following equation:

$$(Ky - y + 1) = K_\infty \times (a^{y+0.5})^2$$

Consequently, when the value of ($Ky - y + 1$) for each Ky is calculated, Table 7 is obtained, as follows:

TABLE 7

| y | Ky | Ky − y + 1 |
|---|---|---|
| 0 | 100 | |
| | | 110 |
| 1 | 121 | |
| | | 133 |
| 2 | 146 | |
| | | 160 |
| 3 | 176 | |
| | | 193 |
| 4 | 212 | |
| | | 233 |
| 5 | 256 | |

Figure 9:
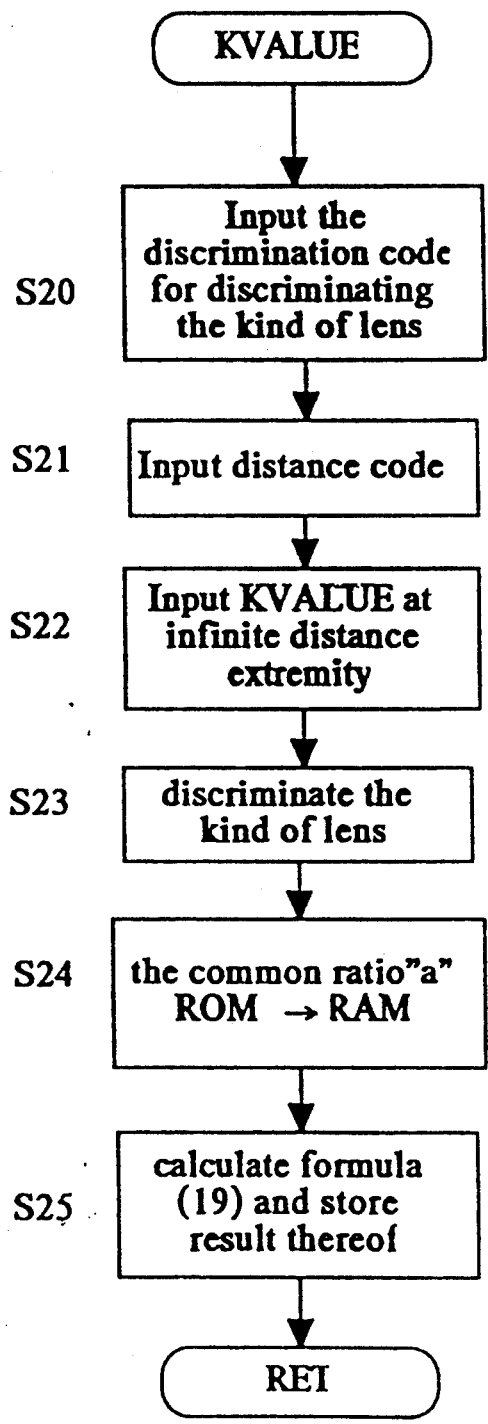

The calculation of the K value by the arithmetic operation means 44 in the macro mode mentioned above will be described below with reference to a flow chart shown in FIG. 9.

For the macro lens, the data of the distance code plate B, instead of the zoom code plate 37 is inputted to the lens CPU 30.

In this state, the discrimination code for determining the type of the lens is input from the lens judging code plate 39 to the lens CPU 30 at step S20.

At step S21, the distance code at the single focus macro mode is inputted to the lens CPU 30 from the distance code plate B.

At step S22, the drive pulse coefficient K value at the infinite distance extremity is inputted to the lens CPU 30 from the data setting portion 40 through a pin.

At step S23, the lens judging means 45 determines the type of the photographing lens mounted to the camera body 1, in accordance with the lens discrimination code inputted from the lens judging code plate 39 at step S20.

Thereafter, at step S24, the common ratio "a" corresponding to the mounted photographing lens is inputted from the ROM (data storing means 46) of the lens CPU 30 and is stored in the RAM.

Thereafter, the arithmetic operation means 44 calculates the drive pulse coefficient K value at the photographing distance (object distance) "y" in accordance with the equation (19) at step S25. After the calculated K value is stored in the RAM, the control is returned.

The calculation data of the K value is directly transmitted as new communication to the main micro computer 10 and the indication CPU 11 without going through the lens interface 41, so that the main micro computer 10 drives the AF motor 19 in accordance with the calculation data in order to perform macro photographing.

Although the invention has been described with reference to particular means, materials and embodiments, it is to be understood that the invention is not limited to the disclosed particulars and extends to all equivalents within the scope of the claims.

We claim:

1. A camera system for communicating data between a micro computer in a camera body and a zoom lens mounted to said camera body, wherein at least exposure data on a diaphragm is transmitted from said zoom lens to said micro computer in said camera body, and wherein said zoom lens comprises:
   a position detecting means for detecting one of a plurality of divided focal length steps corresponding to a focal length of said zoom lens;
   a storing means for storing data peculiar to said zoom lens; and
   an arithmetic operating means for calculating said exposure data on said diaphragm in accordance with data of said position detecting means and said data in said storing means.

2. A camera system according to claim 1, wherein said micro computer of said camera body comprises an indication CPU and a main CPU.

3. A camera system according to claim 1, wherein said zoom lens comprises a lens CPU.

4. A camera system according to claim 1, wherein said data stored in said storing means comprises gradients "$m_1$" and "$m_2$" of a predetermined function and minimum Av value "AvminW" at a wide angle extremity, and wherein said arithmetic operating means fetches these stored data "$m_1$", "$m_2$" and "AvminW" and focal length data "$f_x$" from said storing means and from said position detecting means, respectively, to calculate a minimum Av value Avmin, using the following equation:

$$Avmin = AvminW + m_1 \cdot f_x.$$

5. A camera system according to claim 1, wherein said data stored in said storing means comprises gradients "$m_1$" and "$m_2$" of a predetermined function and maximum Av value "AvmaxW" at a wide angle extremity, and wherein said arithmetic operating means fetches these stored data "$m_1$", "$m_2$" and "AvmaxW" and focal length data "$f_x$" from said storing means and from said position detecting means, respectively, to calculate a maximum Av value Avmax, using the following equation:

$$Avmax = AvmaxW + m_2 \cdot f_x.$$

6. A camera system according to claim 1, wherein said data stored in said storing means comprises gradients "$m_1$" and "$m_2$" of a predetermined function and a minimum Av value "AvminT" at a telephoto extremity, and wherein said arithmetic operating means fetches these stored data "$m_1$", "$m_2$" and "AvminT" and focal length data "$f_x$" from said storing means and from said position detecting means, respectively, to calculate a minimum Av value Avmin, using the following equation:

$$Avmin = AvminT + m_2 \cdot f_x.$$

7. A camera system according to claim 1, wherein said data stored in said storing means comprises gradients "$m_1$" and "$m_2$" of a predetermined function and a maximum Av value "AvmaxT" at a telephoto extremity, and wherein said arithmetic operating means fetches these stored data "$m_1$", "$m_2$" and "AvmaxT" and focal length data "$f_x$" from said storing means and from said position detecting means, respectively, to calculate a maximum Av value Avmax, using the following equation:

$$Avmax = AvmaxT + m_2 \cdot f_x.$$

8. A camera system according to claim 1, wherein said data stored in said storing means comprises data of an effective aperture of said zoom lens, and wherein said arithmetic operating means calculates a maximum Av value and a minimum Av value, in accordance with said stored data of an effective aperture and focal length data detected by said position detecting means.

* * * * *

UNITED STATES PATENT AND TRADEMARK OFFICE
CERTIFICATE OF CORRECTION

PATENT NO. : 5,166,717
DATED : November 24, 1992
INVENTOR(S) : M. Kawasaki, et. al.

It is certified that error appears in the above-indentified patent and that said Letters Patent is hereby corrected as shown below:

Title page, item [56], after "Primary Examiner", change "Gellinen" to --Gellner--.

Column 20, line 25, claim 6, change "$m_2$" to --$m_1$--.

Signed and Sealed this

Nineteenth Day of July, 1994

Attest:

BRUCE LEHMAN

Attesting Officer

Commissioner of Patents and Trademarks